(12) United States Patent
Bullock

(10) Patent No.: US 8,888,424 B1
(45) Date of Patent: Nov. 18, 2014

(54) LOAD STABILIZING

(71) Applicant: Matthew Bullock, McLean, VA (US)

(72) Inventor: Matthew Bullock, McLean, VA (US)

(*) Notice: Subject to any disclaimer, the term of this patent is extended or adjusted under 35 U.S.C. 154(b) by 0 days.

(21) Appl. No.: 13/959,820

(22) Filed: Aug. 6, 2013

(51) Int. Cl.
B60P 7/08 (2006.01)
B60P 7/15 (2006.01)

(52) U.S. Cl.
CPC *B60P 7/0823* (2013.01); *B60P 7/15* (2013.01)
USPC ............ 410/98; 410/97; 410/99; 410/118; 410/155

(58) Field of Classification Search
USPC ............ 410/34–36, 39, 40, 41, 96–100, 118, 410/155; 53/399; 220/1.5; 248/499; 206/597
See application file for complete search history.

(56) References Cited

U.S. PATENT DOCUMENTS

| | | | |
|---|---|---|---|
| 2,226,373 A | * | 12/1940 | Frear .............................. 410/151 |
| 6,089,802 A | | 7/2000 | Bullock |
| 6,227,779 B1 | | 5/2001 | Bullock |
| 6,607,337 B1 | | 8/2003 | Bullock |
| 6,896,459 B1 | | 5/2005 | Bullock |
| 6,923,609 B2 | | 8/2005 | Bullock |
| 6,981,827 B2 | | 1/2006 | Bullock |
| 7,018,151 B2 | | 3/2006 | Bullock |
| 7,066,698 B2 | | 6/2006 | Bullock |
| 7,290,969 B2 | | 11/2007 | Bullock |
| 7,329,074 B2 | | 2/2008 | Bullock |
| 8,113,752 B2 | | 2/2012 | Bullock |
| 8,128,324 B2 | | 3/2012 | Bullock |
| 8,403,607 B1 | | 3/2013 | Bullock |
| 8,403,608 B1 | | 3/2013 | Bullock |
| 8,403,609 B1 | | 3/2013 | Bullock |
| 8,408,852 B1 | | 4/2013 | Bullock |
| 8,419,329 B1 | | 4/2013 | Bullock |

* cited by examiner

Primary Examiner — Stephen Gordon
(74) Attorney, Agent, or Firm — Banner & Witcoff Ltd.

(57) ABSTRACT

Systems and methods for securing cargo within a cargo container are described. The cargo is loaded within an interior of the container and one or more load restraint strips may be used to secure the cargo. Each load restraint strip may include an affixing region having an adhesive for securing the strip to a wall of the container. One or more braces may be inserted between the cargo and the load restraint strips.

13 Claims, 12 Drawing Sheets

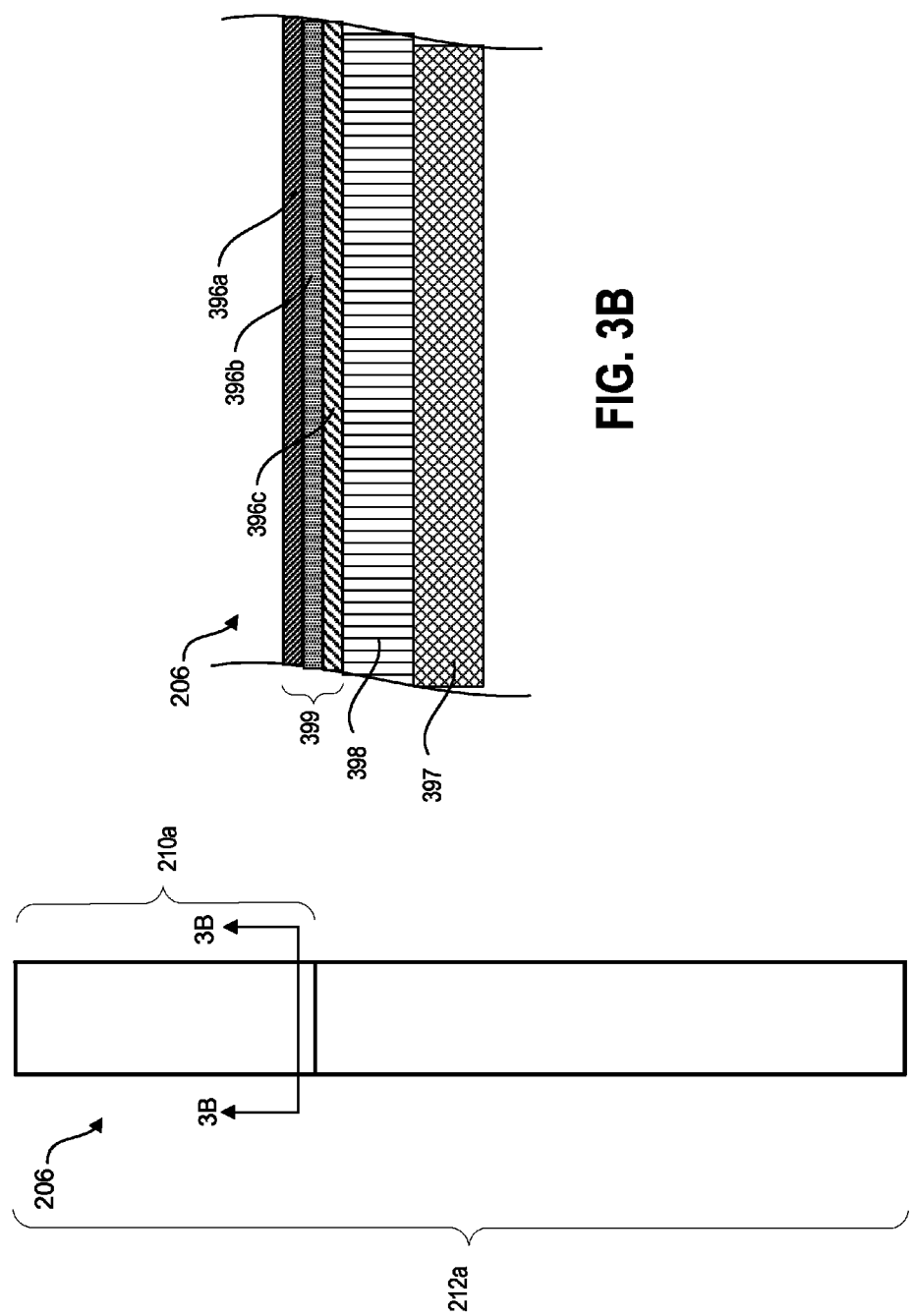

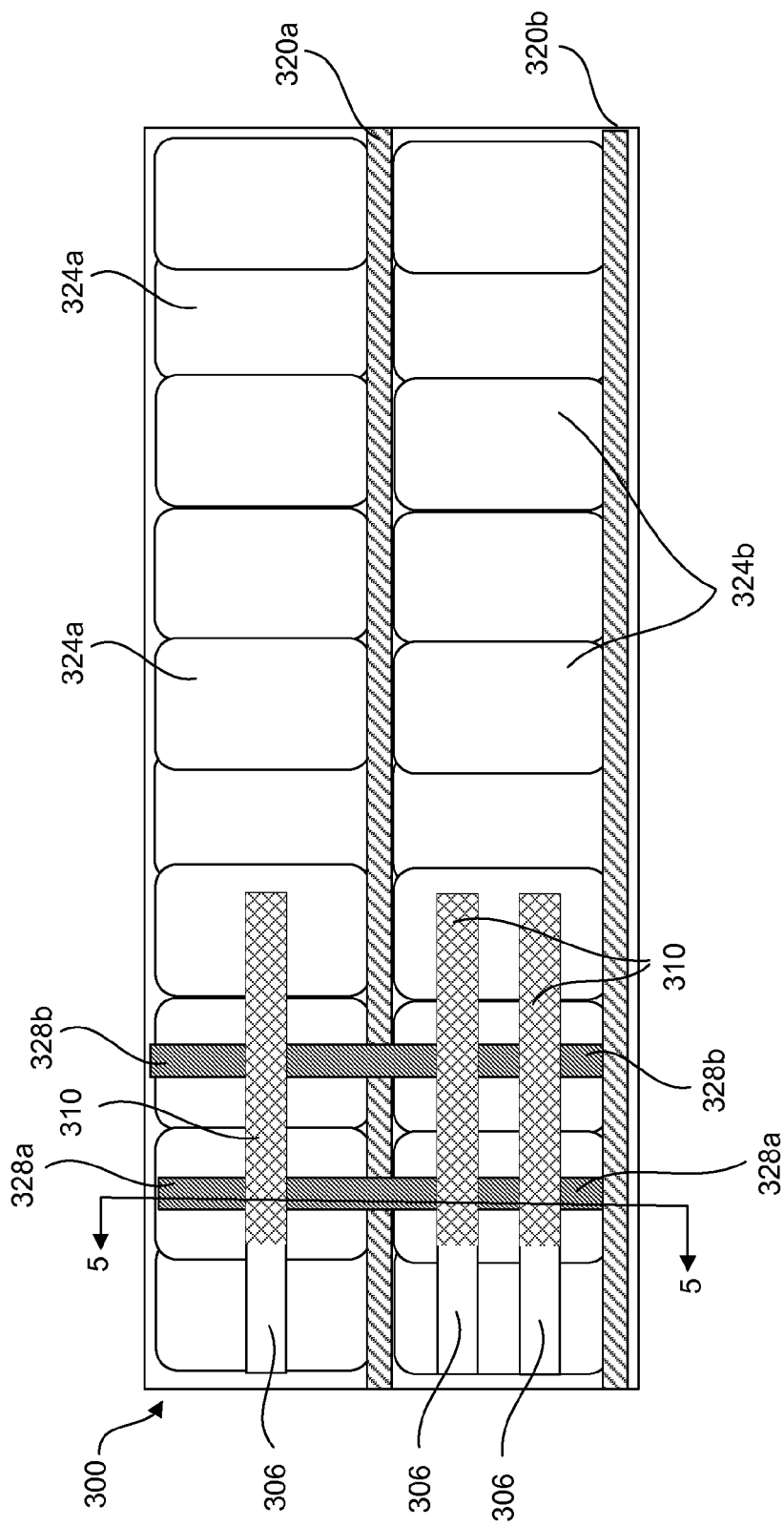

← rear of container    front of container →

← rear of container    front of container →
deceleration →

LOAD STABILIZING

BACKGROUND

Intermodal containers are commonly used when shipping goods domestically and/or internationally. Such containers can be loaded onto cargo ships for transport across oceans or other bodies of water. For land transport, these containers can be placed onto a trailer and then hauled overland by truck. Such containers can also be loaded onto railroad flatcars for transport.

Shipping containers can be loaded with boxes, crates, drums, reinforced bags, plastic wrapped bundles, cased goods, metal coils, specialty heavy paper rolls, plastic or metal containers mounted on pallets, and/or numerous other forms of cargo. Maritime and surface transportation regulations require that such loads be restrained from lateral shifting. In particular, a shipping container may experience significant movement as the container is carried by ocean vessel or by other conveyance. If cargo within the intermodal container is not restrained, it may shift and collide with a container wall or container doors. Because the mass of cargo in a container can be significant, such shifting and/or collisions can have catastrophic consequences for transport workers and for the public at large. For example, shifting cargo can be damaged when colliding with a container wall and/or be crushed by other shifting cargo. Damaged cargo can lead to release of product, which product may be toxic or otherwise be hazardous. As another example, shifting cargo might change the center of gravity of the shipping container itself and thereby cause significant problems for the ship, truck or other vehicle carrying the container.

FIG. 1 illustrates a known technique for restraining cargo within a shipping container 101. A portion of a top 103 and right side wall 102R have been cut away from container 101 to reveal cargo loaded therein. In the example of FIG. 1, the cargo includes a load of crates 104 and drums 105. FIG. 1 further shows a portion of an interior of a left side wall 102L. Crates 104 and drums 105 are secured against movement toward the rear 111 of container 101 by a restraint system that includes multiple restraining strips 106. Each strip 106 is flexible and has an adhesive-coated end 107. An end 107a of a first strip 106a is pressed against an interior surface of side wall 102R. The other end 108a of strip 106a is then wrapped around the rear of a portion of crates 104. Strip end 107a and other strip ends in FIG. 1 are stippled to indicate the presence of adhesive; the stippling in FIG. 1 is not intended to indicate a color differential.

A second strip 106b is similar to strip 106a and has an adhesive-coated end (not shown) similar to end 107a of strip 106a. The adhesive-coated end of strip 106b is secured to the interior surface of side wall 102L in a position that is at generally the same height as end 107a. The end 108b of the strip 106b is then wrapped around the rear of the portion of crates 104 similar to end 108a. Ends 108a and 108b are then tightened (e.g., using a tool and method such as is described in U.S. Pat. No. 6,981,827, incorporated by reference herein). A third adhesive-backed strip 109 is then applied over the tightened ends 108a and 108b to secure those ends together. In a similar manner, strips 106c and 106d and other pairs of strips 106 are used to secure crates 104 and drums 105 from lateral movement.

There are various types of known restraining strips that can be used in the configuration of FIG. 1. Such strips typically include a backing and some form of reinforcement. Examples of known strips are described in one or more of U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852 and 8,419,329. Use of these and other types of restraining strips such as is shown in FIG. 1 represents a substantial improvement over previous methods for restraining cargo. However, improvement in the adhesion of the restraining strips under load, as well as a reduction in the number of strips required to secure a load would be advantageous.

For example, although cargo may be restrained, it often imposes severe forces on a load restraint system during transport. For example, a container may abruptly decelerate (e.g., in response to a sudden stop of a vehicle carrying the container) or accelerate (e.g., in response to sudden movement of the vehicle). As another example, a large portion of cargo weight may be supported by a load restraint system if a container is tilted from the horizontal (e.g., on a rolling ship at sea). Such forces imposed on a load restraint system by the cargo may stress the adhesive used to affix the load restraint strips to the wall of the cargo container. In some examples, the stress may overcome the adhesive bond and the strip may pull away or peel back from the wall.

Further, cargo containers are often loaded in a high throughput environment. In other words, it is often the case that numerous containers must be loaded as quickly as possible. In the case of Department of Defense shipments, for example, container stuffing and mobilization speed is of extreme logistical and tactical importance. It is thus advantageous to minimize the amount of time needed to load each container. Attaching load restraint strips (or other type of securement system) accounts for a significant amount of the time needed to load each container.

SUMMARY

This Summary is provided to introduce a selection of concepts in a simplified form that are further described below in the Detailed Description. This Summary is not intended to identify key or essential features of the invention.

One or more aspects described herein relate to a method for securing a cargo load within a cargo container. In some examples, a load restraint strip may be affixed to a wall of a cargo container. The cargo may be loaded into the container and one or more braces may be positioned between the wall of the container and the cargo. The brace may be positioned so as to contact or be closely spaced from a corresponding portion of the load restraint strip and exert a reactive outward pressure on that corresponding portion when the strip is subjected to an increased force. This aids in maintaining a bond between an affixing region of the strip and the wall. The brace may also act as a rigid surface to prevent slow peeling of the restraint adhesive.

Additional aspects described herein relate to a load restraint system. The load restraint system may include a load restraint strip having an affixing region. The system may further include a brace in contact with the load restraint strip. The system may further include a brace positioning member configured to maintain the brace in a desired position. In some examples, the load restraint strip may be connected to a wall of a cargo container and the brace may contact or be closely spaced from the affixing region of the load restraint strip to reinforce the bond between the affixing region and the wall.

Still other aspects described herein relate to a load restraint strip. A load restraint strip according to certain embodiments may include a base layer and a reinforcement layer. That reinforcement layer may include only cross-weave reinforcement materials.

BRIEF DESCRIPTION OF THE DRAWINGS

Some embodiments are illustrated by way of example, and not by way of limitation, in the figures of the accompanying drawings and in which like reference numerals refer to similar elements.

FIG. 3A is a partially schematic plan view of an example load restraint strip that may be used to restrain cargo according to one or more aspects described herein.

FIG. 3B is a partially schematic cross-sectional view of the example load restraint strip of FIG. 3A taken along line 3B.

FIGS. 4A-4C are partially schematic side views of the interior of a cargo container illustrating various load restraint strip and brace arrangements according to one or more aspects described herein.

Figures may not be to scale.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the claimed subject matter.

In some arrangements, a load restraint system described herein may generally include one or more braces. The braces may be positioned between the cargo and a load restraint strip and may aid in maintaining a position of a load restraint strip in response to increased tension in the strip. For instance, braces may cause a portion of an affixing region of a load restraint strip to remain in contact with a container wall, at a desired angle, when the load restraint system is subject to an increase in force. This may reduce or eliminate occurrences of a load restraint strip affixing region peeling away from a cargo container wall when the increased force is imposed.

Figure 2:
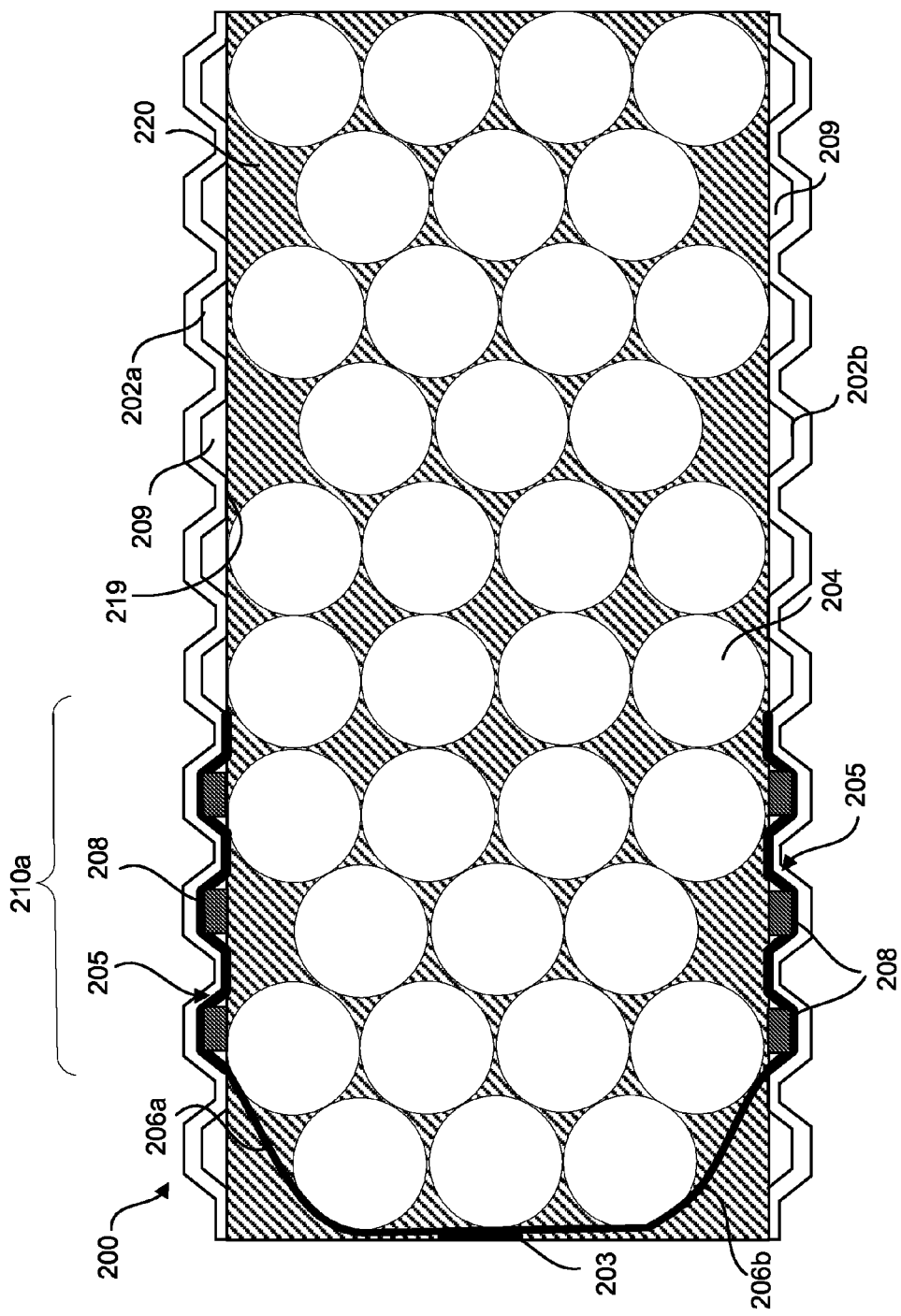
FIG. 2 is a partially schematic top view of an interior of a cargo container illustrating cargo restrained using one or more load restraint strips and one or more braces according to one or more aspects described herein.

FIG. 2 is a partially schematic top view of an interior of a cargo container 200. FIG. 2 is, in essence, a cross-sectional view of loaded container 200 taken from a sectioning plane just below the roof of container 200. FIG. 2 shows load restraint strips 206 and braces 208 arranged according to one or more aspects described herein. Container 200 may be a conventional cargo container, such as intermodal shipping containers described above for shipping goods.

Container 200 includes side walls 202a and 202b (collectively, side walls 202). In some arrangements, side walls 202 may have a corrugated structure. However, various arrangements described herein may be used with other types of wall structures without departing from the invention. Container 200 includes cargo 204 consisting of a plurality of drums. Although only drums are shown in FIG. 2, cargo may include crates, packages, boxes, bulk fluid containers, as well as various other types of cargo or combinations thereof, without departing from the invention. Cargo 204 may be arranged on a base 220. In some examples, base 220 may be a bottom surface of the cargo container 200. In other examples, base 220 may be a pallet or other foundation positioned on the bottom surface of container 200. In still other examples, base 220 may be a foundation placed on top of a level of cargo to form a foundation for another level of cargo (e.g., a second tier of cargo on top of a first tier). In some arrangements, base 220 may be formed of plywood (e.g., standard sheets of plywood or plywood cut to a specific size or configuration) or any other suitable material.

A load restraint system 205 laterally secures cargo 204 within container 200. Load restraint system 205 includes two load restraint strips 206a and 206b (collectively, load restraint strips 206) and a connecting strip 203. Load restraint system 205 is configured to maintain a position of cargo 204 within container 200 during transport. As discussed above, movement of cargo 204 within container 200 can cause damage to the cargo, container, transporting vessel, etc.

Load restraint system 205 extends from side wall 202a, around the rear of cargo 204, to side wall 202b. As used herein when referring to a load restraint strip or element thereof, an "exterior" side, surface, face or other aspect of a load restraint strip or element thereof refers to a side, surface, face or other aspect of that load restraint strip or element that faces away from restrained cargo when that load restraint strip is installed as part of a system to restrain that cargo. Conversely, an "interior" side, surface, face or other aspect of a load restraint strip or element thereof refers to a side, surface, face or other aspect of that load restraint strip or element that faces toward restrained cargo when that load restraint strip is installed as part of a system to restrain that cargo.

Each strip 206 of load restraint system 205 includes a working portion (e.g., working portion 212a in FIG. 3A) and an affixing region 210 (e.g., affixing region 210a shown in FIG. 3A and as indicated by a bracket in FIG. 2). The affixing region forms a part of the working portion and is configured to connect or attach a load restraint strip 206 to an inside surface of a wall 202. Each strip 206 extends from an inside wall (202a or 202b) around the cargo 204 to meet in a mid-region of the container 200. Strips 206 are joined by connecting strip 203. Connecting strip 203 may be an adhesive strip configured to connect an end of each load restraint strip 206.

In some examples described herein, each load restraint strip 206 may be substantially similar or identical and methods of connecting the affixing region of each load restraint strip to a wall of a cargo container may be substantially similar or identical. Accordingly, examples in which affixing of a load restraint strip 206 to a wall 202 are described, as well as various methods of maintaining a position of a load restraint strip 206 so as to avoiding peeling of the load restraint strip, may be provided in the context of a single load restraint strip (e.g., strip 206a) on a first wall (e.g., side wall 202a) of container 200. It should be understood that similar arrangements, methods, etc. would be applied to with regard to the affixing region of another load restraint strip (e.g., strip 206b) on an opposite wall (e.g., side wall 202b).

Load restraint strips 206 may have any of various known structures. For instance, as mentioned above, examples of known strips are described in one or more of U.S. Pat. Nos.

6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852 and 8,419,329. Strips 206 could be strips such as those sold under the trade name TY-GARD2000 by Walnut Industries, Inc. of Bensalem, Pa., USA. Connecting strip 203 could be a product such as that sold under the trade name TY-PATCH by Walnut Industries, Inc.

FIGS. 3A and 3B provide a schematic representation of load restraint strip 206a, with load restraint strip 206b being substantially similar or identical. However, various structures may be used for a load restraint strip without departing from the invention. Load restraint strip 206 includes a working portion 212a and an affixing region 210a that will secure load restraint strip 206a to an inside wall 202 of container 200. A remainder of working portion 212a that extends beyond affixing region 210a is not affixed or attached to a wall but instead forms a portion of strip 206a that extends from the wall around cargo 204. Strip 206a illustrates one affixing region 210 and is intended to be used in conjunction with another strip 206 (e.g., strip 206b) having the same configuration but installed in a mirror image configuration. For example, and as shown in FIG. 2, strip 206a connects to wall 202a and extends past a rear midpoint of cargo 204 and a second strip 206b extends from wall 202b and past the rear midpoint of cargo 204. The two strips may be joined by connecting strip 203. In some examples, a length of a working portion (e.g., working portion 212a) may be between 9 and 14 feet (e.g., 12 feet) and a length of an affixing region (e.g., affixing region 210a) may be between 2 and 6 feet (e.g., 5 feet). A width of each region 210a and 212a may be substantially equal and may be between 10 and 20 inches (e.g., 16 inches).

FIG. 3B is a cross-sectional view of load restraint strip 206a taken along line 3B of FIG. 3A. Load restraint strip 206a includes a laminate type structure in which layers of material form strip 206a. As shown in FIG. 3B, load restraint strip 206a includes three layers of material 399, 398 and 397. Strip 206a may include a base layer 397, a reinforcement layer 398 and, in affixing region 210a, an adhesive layer 399. More or fewer layers may be used to form the strip without departing from the invention.

In some arrangements, the base layer 397 may be formed of a continuous piece of spun bonded polyethylene fiber material. Examples of such material include the product sold under the trade name TYVEK. In other embodiments, another material may be used in base layer 397. Examples of other base layer materials include bands of other types of spun-bonded polymer fibers, films of polyester, polyethylene terephthalate (e.g., such as films sold under the trade name MYLAR) or other polymers, paper, bands of woven, knitted or felted natural fibers (e.g., cotton), and bands of woven or knitted artificial fibers. In still other embodiments, multiple materials may be used in a base layer and/or a base layer may comprise multiple separate material pieces.

Reinforcement layer 398 is fixed relative to base layer 397 and may include reinforcing fibers bonded to the base layer. The reinforcing fibers may be formed of polyester and may be bonded to the layer with a laminating adhesive. The laminating adhesive may be, e.g., a transparent ethylene vinyl acetate water based copolymer adhesive having a viscosity between about 2900 centipoise (cps) and about 3200 cps.

In some examples, the reinforcing fibers may have a generally parallel configuration such that the strands are generally parallel to each other. In other examples, reinforcement materials may include cross-weave reinforcement material as one part of multiple reinforcement materials (e.g., such as is described in U.S. Pat. No. 7,329,074). Additional examples of other types of reinforcement materials include monolithic polymer sheets such as is described in U.S. Pat. No. 6,896, 459.

In some examples, reinforcing layer 398 may have only one cross-weave reinforcement material. That is, in at least one such embodiment, strip 206a may only include a single reinforcement layer 398, and that single reinforcement layer may only include a single layer of cross-weave material (e.g., a single sheet of cross-weave material consisting or consisting essentially of a first set of parallel strands extending in a first direction and a second set of parallel strands interwoven with the first set of strands and extending in a second direction different from the first direction).

Adhesive layer 399 is fixed relative to reinforcement layer 398 and base layer 397. However, unlike reinforcement layer 398 and base layer 397, adhesive layer 399 does not extend the entire length of strip 206a. Rather, adhesive layer 399 is only found in affixing region 210a.

In some example load restraint strip arrangements, adhesive layer 399 includes a first adhesive layer 396a, a second adhesive layer 396c and a substrate layer 396b. Substrate layer 396b at least partially separates adhesive layers 396a and 396c. In some embodiments, however, substrate 396b may include holes or other perforations permitting direct contact between adhesive layers 396a and 396b in certain regions. A release paper liner (not shown) affixed to the exterior side of adhesive layer 399 (e.g., affixed to adhesive layer 396a) may be removed prior to placing the exterior face of affixing region 210a into contact with a container wall. The liner can be formed from, e.g., a paper product that is treated to resist the adhesive layer. Such products include paper that has been coated or otherwise impregnated with wax, silicone or other non-stick material.

In some examples, the various adhesive layers 396a and 396c within adhesive layer 399 may be the same type of adhesive, such as an acrylic adhesive having a shear strength of between about 50 psi and 100 psi.

Substrate layer 396b may be a film of polyethylene terephthalate or other polymer and may act as a carrier for the other adhesive layers within adhesive layer 399. For instance, adhesive layer 399 may, in some examples, be a double-sided tape with substrate layer 396b sandwiched between adhesive layers 396a and 396c. A release paper liner may be attached to one side of the tape to prevent adhesion and the tape may be cut from a larger roll and applied to the desired portion of the strip 206a during a manufacturing process.

In other embodiments, the adhesive layer 399 may include layers 396a and 396c comprising different types of adhesives. For instance, adhesive layer 396a is adhered to a container wall 202 when strip 206a is installed. Many applications require that an adhesive bond between an affixing region and a container wall be nonpermanent. When a container reaches its destination and strips are removed, it is desirable that little or no adhesive residue remain on the container wall. For this and other reasons, it is often desirable for the wall-contacting adhesive layer to be a high shear strength pressure-sensitive acrylic adhesive that can accommodate a large temperature gradient. Because adhesive layer 396c does not contact the container wall 202, however, adhesive residue is not a concern. Accordingly, adhesive layer 396c can comprise other types of adhesives having different properties than the adhesive used for layer 396a. For example, the adhesive of the layer 396c could be selected to have higher shear and peel strengths than the adhesive of layer 396a so as to ensure that substrate 396b does not separate from strip 206a when strip 206a is removed from a container wall. In some such embodiments, the layer 396c adhesive could be a rubber based type of adhesive or could be an acrylic adhesive with a different formulation than the adhesive of the first layer 396a.

With further reference to FIG. 2, affixing region 210a of load restraint strip 206a may be installed so as to follow a contour of wall 202a. As discussed above, walls 202 may be corrugated, or formed of a series of alternating ridges and grooves. As used herein, the ridges are those portions of a wall 202 that extend inward toward an interior region of a cargo container. Grooves refer to spaces in a wall that extend outward toward an exterior of a cargo container. A single groove 209 and a single ridge 219 are marked in FIG. 2.

Once strips 206a and 206b are installed, the affixing regions generally follow ridges and grooves of the corrugated walls 202. As discussed above, adhesive portions of the strips' affixing regions are used to secure strips 206 to walls 202. One or more braces 208 are also included. Braces 208 help to maintain contact between affixing regions of strips 206 and portions of walls 202 within grooves 219 when a strip 206 is subject to an increased force. As a result, the overall strength of load restraint system 205 is improved. FIGS. 9A through 10B schematically show how a brace such as one of braces 208 can help increase restraint system strength.

Figure 9A:
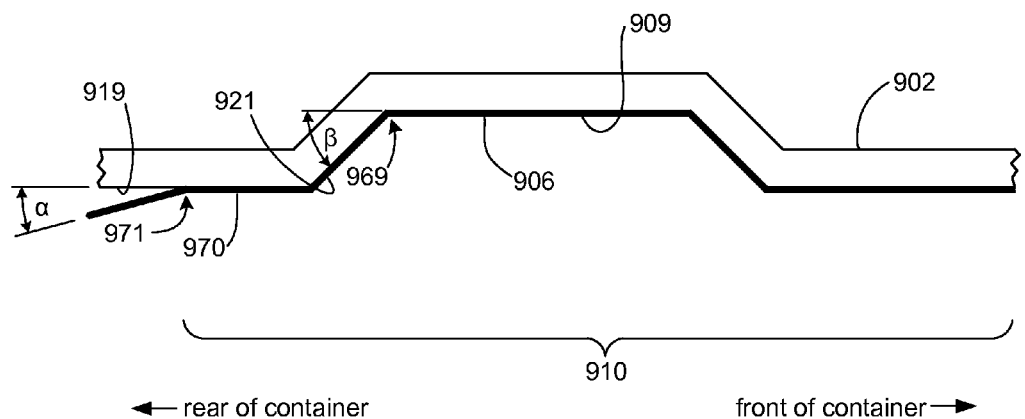
FIGS. 9A-9B are partially schematic area cross-sectional views of a load restraint strip installed according to a conventional method.
Figure 9B:
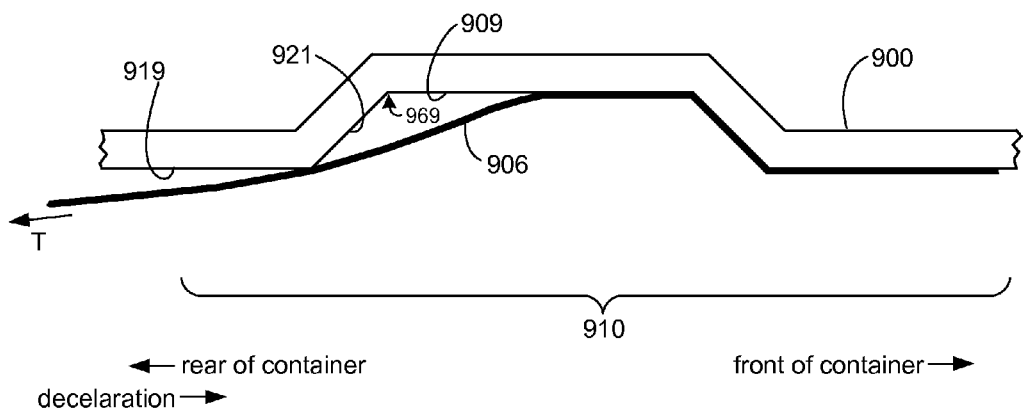

FIGS. 9A and 9B are partially schematic, area cross-sectional top views of a cargo container similar to container 200 of FIG. 2. The sectioning plane associated with FIGS. 9A and 9B is located just below the container roof. The rear of the container is to the left in FIG. 9A and the front of the container is to the right in FIG. 9A. Shown in FIGS. 9A and 9B is a portion of a container wall 902 similar to wall 202a of FIG. 2. Container wall 902 includes a series ridges 919 and grooves 909 similar to ridges 219 and grooves 209, as well as a series of inclines 921 connecting ridges 919 and grooves 909. A load restraint strip 906 is installed in a conventional manner such as that of FIG. 1. In particular, an adhesive on an exterior face of an affixing region 910 is bonded to the interior side of wall 902 and extends across multiple ridges 919, grooves 909 and inclines 921. Additional forwardly-located grooves 909, ridges 919 and inclines 921 and the portion of affixing region 910 adhered to some of those forwardly-located grooves, ridges and inclines are omitted for simplicity. Rearwardly located portions of wall 902 are also omitted.

The conventional installation shown in FIG. 9A lacks a brace similar to brace 208. An end 971 of affixing portion 910 is indicated. At end 971, strip 906 extends away from wall 902 at an angle α. Ideally, angle α is approximately 15° or less so that the force on the portion 970 of affixing region 910 immediately forward of end 971 is primarily in a shear direction (i.e., parallel to the plane of adhesion) instead of a peel direction (i.e., perpendicular to the plane of adhesion). Because the shear strength of the affixing region 910 adhesive is substantially greater than the peel strength, a smaller angle α corresponds to a stronger bond between strip 906 and wall 901.

Inclines 921 form an angle β relative to the plane of a groove 909. In a conventional intermodal container, angle β is approximately 45°. This is substantially greater than 15°. Once the shear strength of the bond in region 970 and the immediately adjacent inline 921 is overcome, the force on the portion of strip 906 forward of location 969 will have a much greater peel component, and thus the strength of the adhesive bond to wall 902 will be substantially reduced. This is shown in FIG. 9B. A tension T is caused by an abrupt deceleration of the container. Tension T is enough to overcome the shear strength associated with regions 970 and first incline 921. Strip 906 then begins peeling away at point 969, ultimately causing the entire affixing region 910 to become unbonded from wall 901.

Figure 10A:
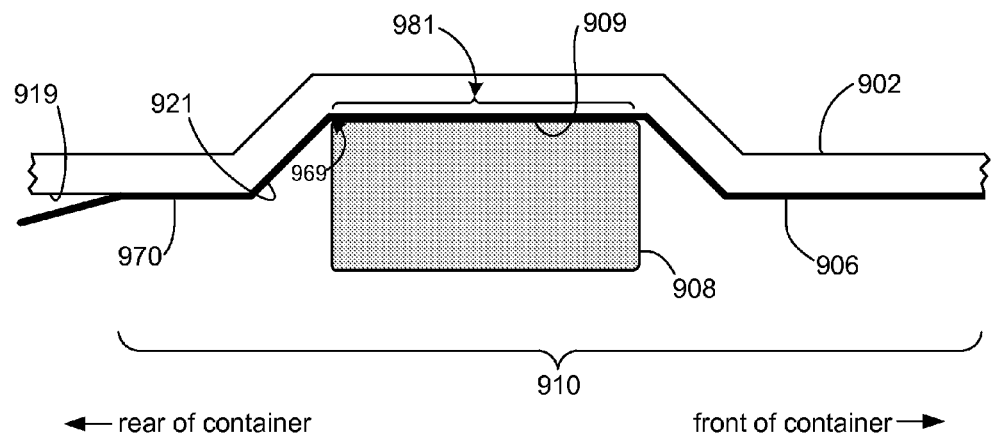
FIGS. 10A-10B are partially schematic area cross-sectional views of a load restraint strip installed according to one or more embodiments.
Figure 10B:
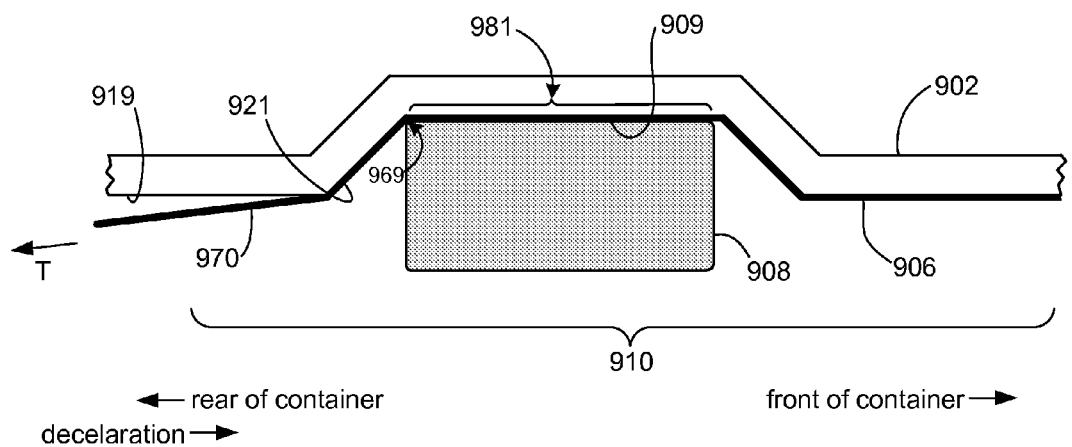

FIGS. 10A and 10B show an installation of strip 906 according to some embodiments. FIGS. 10A and 10B are area cross-sectional top views similar to FIGS. 9A and 9B. As in FIG. 9A, affixing region 910 of strip 906 is bonded to wall 902. However, a brace 908 has been placed so as to be located within a groove 909. Brace 908 may be in contact with wall 902 in groove 909 or may be displaced slightly inward such that there is a small space (e.g., approximately 0.25 inches) between an exterior face 925 of brace 908 and the interior face of groove 909. Brace 908 may be held in place, in any of various manners described below, by a base, by a portion of cargo, and/or by another brace positioning body. As seen in FIG. 10A, brace 908 corresponds to a portion 981 of strip 906 that is located between brace 908 and wall 902.

FIG. 10B shows strip 906 when a tension T is imposed. Because brace 908 is in place, most of strip 902 within groove 909 is kept parallel to the interior face of groove 909. Thus even if tension T is sufficient to overcome the shear strength of strip 906 in regions 970 and first incline 921, and even if strip 906 begins to peel from wall 902 at location 969, the remainder of strip 906 in groove 909 is maintained at a shear angle instead of a peel angle. As a result, separation of strip 906 from wall 902 may be arrested.

In some embodiments, the brace 208 may have a shape or cross section corresponding to the shape or cross section of a container wall groove such as grooves 209 formed in the wall 202. In other examples, the brace 208 may have a variety of other shapes or cross sections, such as rectangular (e.g., as shown in FIGS. 10A and 10B), square, and the like. In some embodiments, for example, a brace 208 may be between 1" and 4" wide and between 1" and 3" thick. The length of brace 208 may depend on the arrangement in which it is used, as will be discussed more fully below. Brace 208 may be formed of one or more suitable materials, such as wood, composite, compressed paper, rigid cardboard, fiberboard corner protectors (v-shaped), plywood strips, honeycomb paper dunnage, and the like. In some embodiments, a brace 208 may be a section of a conventional 2"×3" nominal size (approximately $1\frac{5}{16}^{th}$ inch×$2\frac{5}{16}^{th}$ inch actual size) wooden stud.

As shown in FIGS. 2 and 4A-5, each brace may be positioned between an interior (e.g., inward facing, toward the cargo 204 contained in the cargo container 200) side of an affixing region of a load restraint strip and the cargo. In some examples, the brace may be held in place by a friction fit between a container wall (with the corresponding portions of the load restraint strip affixed thereto) and a brace positioning body. The brace positioning body may be, e.g., the cargo and/or a base, as will be discussed more fully below.

When positioned against or very close to a load restraint strip 206, and as explained above in connection with FIGS. 10A and 10B, brace 208 aids in maintaining a position of the load restraint strip 206 when increased forces are imposed on the load restraint system. That is, an affixing region of the load restraint strip may pull away or begin pulling away from the wall 202 to which it is connected if cargo accelerates, decelerates or is tilted so as to create sufficient force to overcome strip-wall adhesive bonds. Brace 208 may reduce or prevent the affixing region from peeling away from the wall because it imposes a reactive outward pressure on a corresponding portion of the affixing region so as to prevent the affixing region from peeling away from the container wall.

In some conventional systems, the strength of the adhesive may be limited by its chemical and/or material composition, and because the adhesives used in this application may need to be removable from a wall of a container and leave behind little or no residue. Accordingly, in conventional arrangements such as in FIG. 1, the adhesive used to affix a strip to a wall will often fail under peel conditions (such as shown in FIG. 9B) before the strip will break. Thus, the strength of the strip used was less significant since it was likely that the strip would separate from the container wall before the strength of the strip would prove insufficient to restrain the load and break. Accordingly, the number of strips needed to safely secure cargo was a function of adhesive strength of each strip system (e.g., region 107a of strips 106a in FIG. 1 and the corresponding region of strip 106b) at the strip/container wall interface. However, use of braces such as is described herein can strengthen the connection between the affixing region of the load restraint strip and the wall. Thus, fewer strips and/or strips of increased strength may be used instead of multiple strips. In some examples, reinforcement of the adhesive of one load restraint strip 206 with one or more braces 208 may permit strips having double or even triple the strength of a typical load restraint strip to be used. In some examples, a strip 206 may even break before the adhesive pulls away from the wall in arrangements using one or more braces 208 for reinforcement.

Figure 4A:
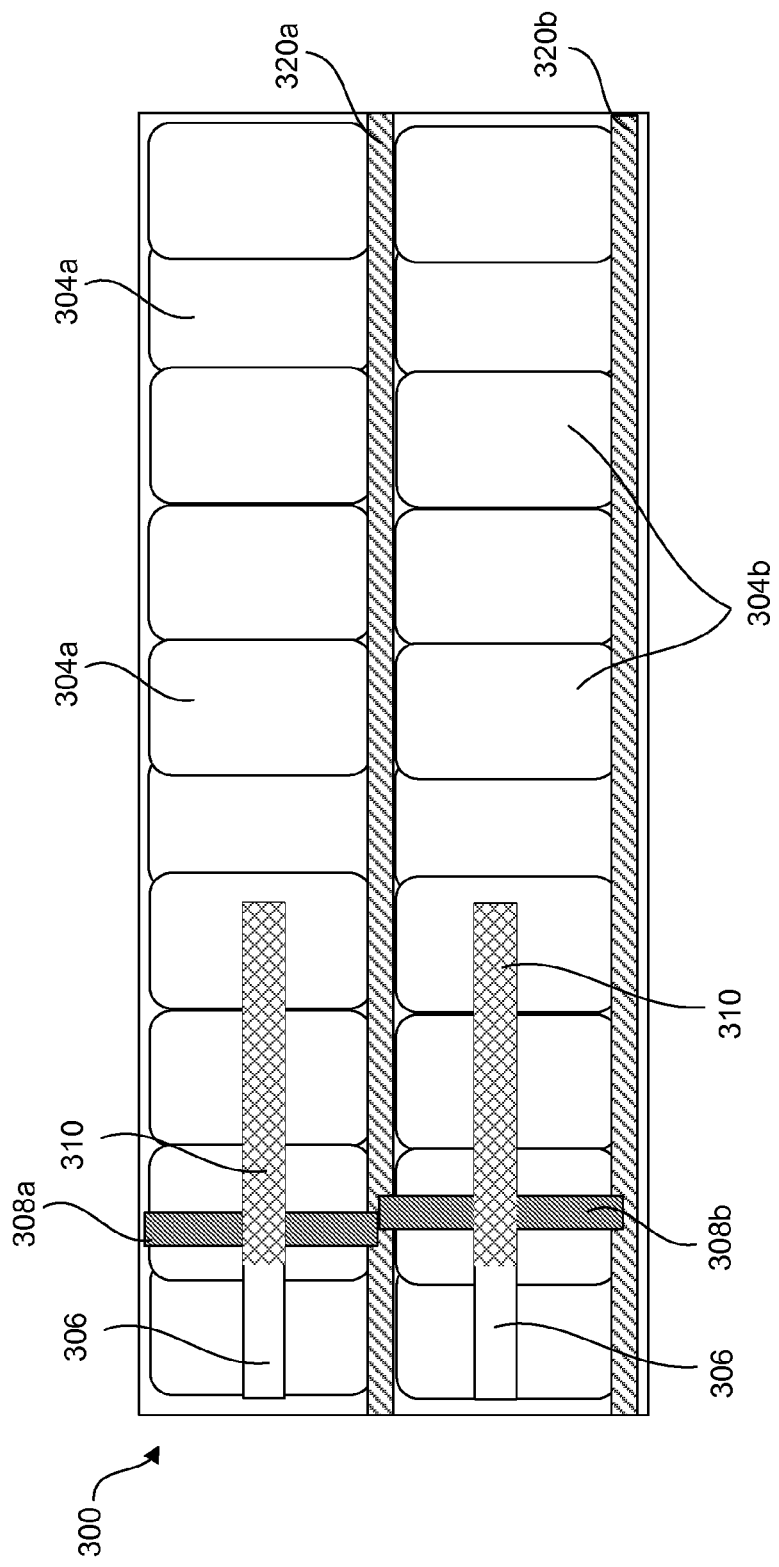
Figure 4B:
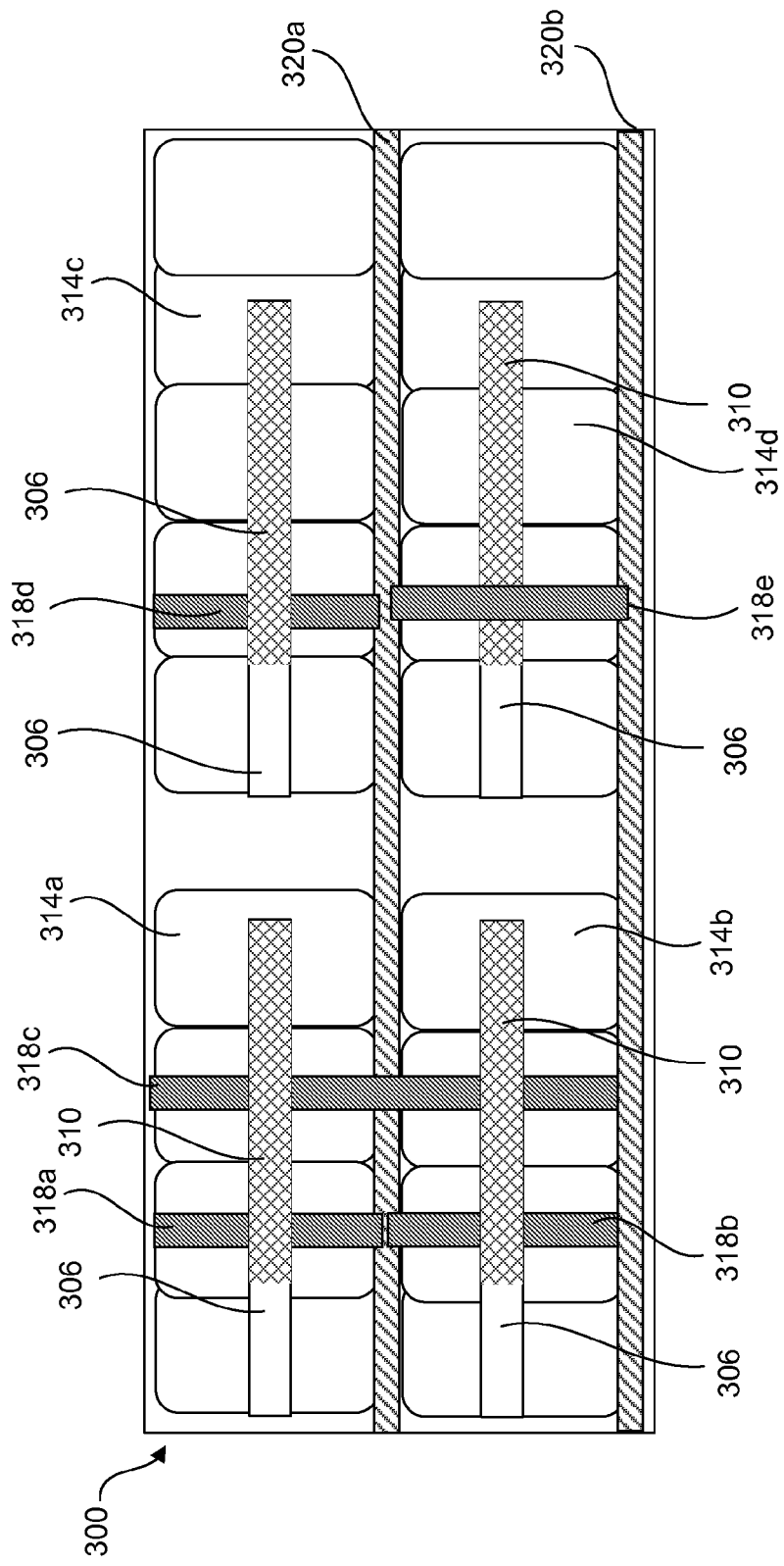

FIGS. 4A-4C are partially schematic side views of an interior of a cargo container 300 according to an alternate configuration. Container 300 is similar to container 200 in FIG. 2. For instance, FIGS. 4A-4C are side views of container 300 shown as if the side wall (e.g., 202b in FIG. 2) was invisible. FIGS. 4A-4C illustrate various load restraint systems 305 including load arrangements of restraint strips 306 and braces 308 that may be used in various cargo containers, such as container 300. Strips 306 and braces 308 may be similar to strips 206 and braces 208 shown in FIG. 2. Each cargo container 300 may be loaded in a manner similar to cargo container 200 shown in FIG. 2 and may include two tiers of cargo 304a and 304b. Each tier of cargo 304a and 304b may further include a pair of load restraint strips 306, with one strip of each pair of strips visible from the side of the container 300 shown. The load restraint strips 306 each may extend in a generally horizontal direction from a side wall of the container 300 around the cargo 304 toward a mid-region of the cargo container 300. As discussed above, each pair of strips 306 is then joined by a connecting strip (not shown in FIGS. 4A-4C). The cargo, load restraint strip and brace arrangements in FIGS. 4A-4C are merely some example arrangements. The number of tiers of cargo (e.g., one tier, three or more tiers), sections of cargo (as shown in FIG. 4B), number of load restraint strips or pairs of load restraint strips associated with each tier of cargo, number of braces per side or per tier of cargo, etc. may vary without departing from the invention.

As shown in the first example configuration of FIG. 4A, two tiers of cargo 304a and 304b are shown, one on top of the other. Tiers of cargo 304a and 304b include respective bases 320a and 320b on which the cargo is arranged. As discussed above, bases 320a and 320b may be pallets or plurality of pallets, sheets or pluralities of sheets of plywood, and the like. In some examples, base 320a or 320b may be plywood sheets cut to a desired width. Additionally or alternatively, base 320a and 320b may be made of different materials. Base 320b may also be a bottom surface of the container 300.

As discussed above, a load restraint strip 306 may extend from one side of cargo container 300 around cargo 304 to join another load restraint strip (not shown in FIG. 4A) in a mid-region of container 300 in order to secure cargo 304 in place and reduce or prevent shifting of cargo 204. Load restraint strip 306 may be affixed or secured to a side wall (not shown in FIGS. 4A-4C) via an adhesive arranged on an affixing region 310 of load restraint strip 306. Affixing region 310 is shown in FIGS. 4A-4C in cross-hatch to indicate the portion engaged with the wall. The cross-hatch does not necessarily indicate a change in color or appearance of the affixing region 310 of load restraint strip 306 relative to other external regions of the strip 306 working portion.

In the arrangement shown in FIG. 4A, each tier of cargo 304 includes a load restraint strip 306. Further, each tier of cargo 304 may include at least one brace 308. As discussed above, only one side of the cargo container 300 is shown and thus, one brace 308a or 308b per tier of cargo is shown in FIG. 4A. However, it should be noted that the opposite side of container 300 may include a similar arrangement or mirror image of the securing arrangement shown in FIG. 4A. That is, each tier may include a second brace on the opposite side of container 300 in a manner similar to that shown in FIGS. 4A-4C.

In the arrangement of FIG. 4A, each brace 308a and 308b may extend in a generally vertical configuration along a side of the cargo container 300. Brace 308a may extend from a top portion of the cargo container 300 to a middle portion of the cargo container 300, while brace 308b may extend from a bottom portion of the cargo container 300 to the middle portion of the cargo container. Thus, each brace 308a and 308b may be a separate piece that may be positioned as desired along the respective tier of cargo 304a or 304b. In some examples, a length of each of braces 308a and 308b may be between 3' and 6'.

Each tier of cargo 304a and 304b includes one load restraint strip 306. Although additional load restraint strips 306 may be used as desired or needed because of various characteristics (e.g., mass) of the cargo 304, it is advantageous to use the fewest number of load restraint strips that will safely secure the load. Accordingly, use of braces 308 may reduce the need for additional load restraint strips 306. For instance, without use of braces in FIG. 4A, additional load restraint strips 306 may be needed to secure each tier of cargo 304a and 304b. However, with the use of the braces 308a and 308b, the adhesive bond between the affixing regions 310 of the load restraint strips 306 and the wall is enhanced and thus, only one load restraint strip 306 is used per tier per side in this example. The reduced number of load restraint strips may decrease load time for the cargo container 300, thereby improving efficiency and reducing costs.

Braces 308a and 308b are shown in FIG. 4A as at least partially overhanging one or more of base 320a and 320. In some examples, braces 308a and 308b may be held in place by a friction fit between the wall of the container 300 and at least a portion of base 320a and/or base 320b. In other examples, a friction fit may be created between the wall and the cargo itself. In still other examples, a brace 308 may be held in place using one or more fasteners, such as screws, nails, etc., that may secure a brace 308 to one or more of bases 320a and 320b, or other structure within the container. In these examples, as a brace 308 extends along the groove in the wall, the brace 308 is positioned to exert a reactive outward pressure on a corresponding portion of an interior face of a load restraint strip 306 arranged between the brace and the wall. This outward pressure enhances the adhesive bond between the exterior face of the strip 306 and the wall of the container 300 by preventing most of the corresponding strip portion from achieving an angle, relative to the container wall, having a significant peel component. In the example arrangements, the brace or braces may be removably connected to the system or removably inserted into the container, such that they may be removed and reused once the cargo has arrived at its destination. Because the bracing material itself is relatively inexpensive, however, it may alternatively be discarded.

In some example configurations, if only one brace 308 is used on each side of a tier of cargo, it may be preferable to position the brace as near as possible to the transition between the affixing region 310 of a load restraint strip and the remainder of the working portion of the strip. In some conventional systems, an angle α (see FIG. 9A) of the strip formed as the affixing region transitions to the remainder of the working portion and the strip extends from the wall toward the interior of the cargo container, and is kept relatively shallow (e.g., by positioning cargo to keep the strip along or near the wall even beyond the affixing region). However, by positioning the brace near the transition, the angle at which the transition occurs can be larger because the brace enhances the adhesive bond between the strip and the wall and arrests any peeling that may be initiated.

With reference to FIG. 4B, another configuration of load restraint systems using load restraint strips and braces is illustrated. Unlike the arrangement shown in FIG. 4A, cargo 314 is arranged in a forward section comprised of two tiers of cargo 314a and 314b and a rear section comprised of two tiers of cargo 314c and 314d. Each of the forward and rear sections includes load restraint systems having pairs of load restraint strips and braces. The installation and function of the load restraint systems in each of the forward and rear cargo sections is substantially similar to the arrangements described above and the forward and rear sections of cargo shown in FIG. 4B are merely one example of the use of multiple load restraint systems within a cargo container. Additional sections of cargo may also be secured by load restraint systems such as those described herein.

Each tier of cargo 314a-314d is arranged on a base 320a or 320b. Although each base 320a and 320b is shown as extending an entire length of the container 300, the bases 320a and 320b may be formed in multiple pieces or may include a split between the forward cargo section and the rear cargo section. Each tier of cargo 314a-314d includes pair of load restraint strips 306 (with only one strip 306 of the pair of strips visible in FIG. 4B). However, the brace arrangement used in FIG. 4B differs from that of FIG. 4A. Braces 318a and 318b respectively extend along each tier of cargo 314a and 314b. Braces 318d and 318e respectively extend along tiers of cargo 314c and 314d. An additional brace 318c extends along both tiers of cargo 314a and 314b. That is, brace 318c extends from a top portion of the cargo container 300 to a bottom portion of the cargo container 300. In this arrangement, the brace 318c may pass between base 320a and the wall of the cargo container 300. In some examples, the brace 318c may be held in position, at least in part, by the base 320a. That is, as the brace 318c is positioned between the base 320 and the wall (e.g., along a groove in the corrugation), a friction fit may be created to maintain the position of the brace 318c, thus aiding in maintaining the position of the affixing region 310 of each load restraint strip 306. Brace 318c may generally be longer than the other braces illustrated thus far. In some examples, brace 318c may be between 5' and 10' in length.

As shown in FIG. 4B, multiple braces may be used to further aid in reinforcing the adhesive bond between an affixing region 310 of a load restraint strip 306 and a wall of the cargo container 300 in order to maintain the position of the cargo 314. That is, two or more braces on each side of a tier of cargo may provide additional points of contact between the brace and the load restraint strip, thereby providing additional outward reactive pressure to enhance the adhesion of the affixing region to the wall of the cargo container.

FIG. 4C illustrates yet another configuration of a cargo container 300 having a load restraint system including load restraint strips 306 and braces 328. The cargo container 300 includes one pair of load restraint strips 306 (with only one strip visible in FIG. 4C) on the upper tier of cargo 324a and two pairs of load restraint strips 306 (with only one strip 306 of each pair visible in FIG. 4C) on the lower tier of cargo 324b. The additional pair of load restraint strips 306 on the lower tier of cargo 324b may be provided for additional stability and or securing of the cargo 324b. FIG. 4C includes two braces 328a and 328b. Each of the two braces 328a and 328b extends along each tier of cargo 324a and 324b (e.g., from a top region of the container 300 to a bottom region of the container 300). Accordingly, each brace 328a and 328b contacts (or is closely spaced from) load restraint strips 306 to aid in securing the affixing portion 310 of each strip 306 to the wall of the cargo container 300.

The example arrangements shown in FIGS. 4A-4C are merely some example load restraint system arrangements that may be used to secure cargo using pairs of load restraint strips and braces. Various other example configurations may be used without departing from the invention. For instance, arrangements similar to the example shown in FIG. 4A may include a single brace extending along both tiers of cargo 304a and 304b, rather than two separate braces 308a and 308b. Still other arrangements may include only a single tier of cargo (e.g., an arrangement similar to FIG. 4A but including only tier 304b) and having a single pair of load restraint strips 306 and a single brace 308 on each side. In still other arrangements, the single tier of cargo may have two or more pairs of load restraint strips 306 and/or two or more braces 308 on each side. Other arrangements may include a two-tiered cargo load physically separate from but in a container with a single tier cargo load (similar to the arrangement of FIG. 4B). Each load section may have different load restraint system arrangements including differing numbers of pairs of load restraint strips and/or braces. Any individual tier of cargo may include various different load restraint strip and/or brace configurations without departing from the invention.

Figure 5:
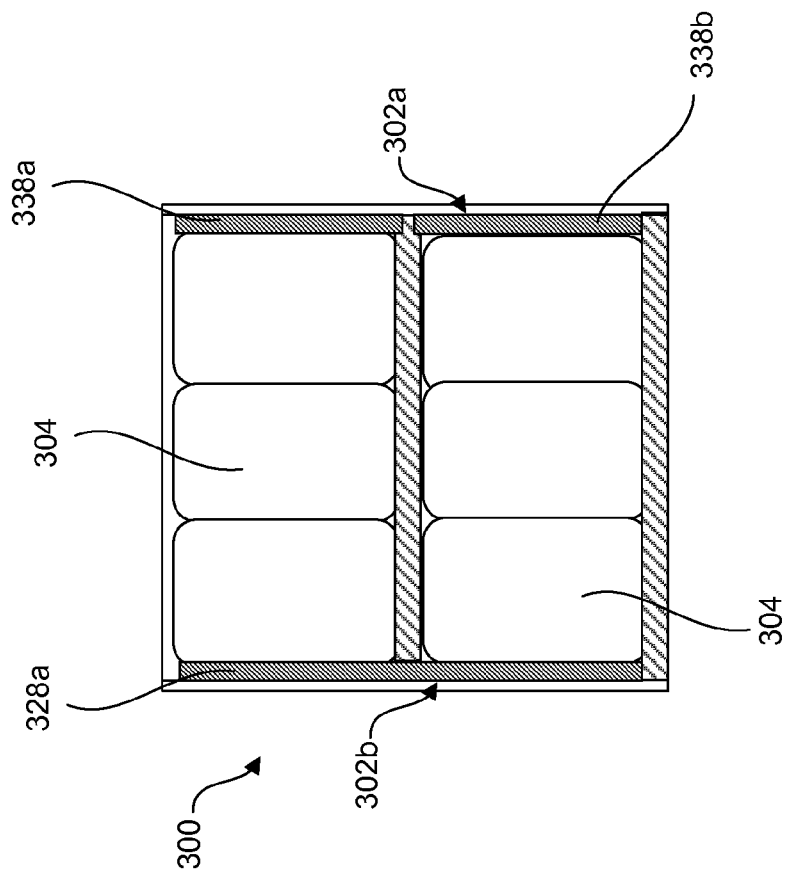
FIG. 5 is a partially schematic rear, cross-sectional view of an interior of a cargo container showing a plurality of braces used in connection with restraining cargo according to one or more aspects described herein.

FIG. 5 is a cross sectional view of a cargo container 300 taken along line 5 of FIG. 4C. The cargo container 300 includes cargo 304 contained therein. Further, braces 328a, 338a and 338b extending along interior sides 302a and 302b of container 300 are shown. Although load restraint strips are not shown in FIG. 5, the affixing portions may generally extend along each interior side 302a and 302b of container 300, as shown in FIGS. 2 and 4A-4C.

As shown in FIG. 5, each side 302a and 302b of container 300 includes a different brace arrangement. For instance, brace 328a extends along substantially the entire wall 302b of the container and may contact load restraint strips restraining both tiers of cargo 304. As discussed above, brace 328a may be held in place via a friction fit between wall 302b and base 320a and/or cargo 304.

The brace arrangement shown on side 302a may differ from that of side 302b. As shown, braces 338a and 338b each extend along wall 302a and along one tier of cargo 304. Accordingly, each brace 338a and 338b may be approximately one half the size of brace 328a. However, braces 338a and 338b may be held in place using arrangements similar to those discussed above and may provide the same or similar outward reactive pressure to enhance the strength of the adhesive bond between the strip and the wall.

Figure 6:
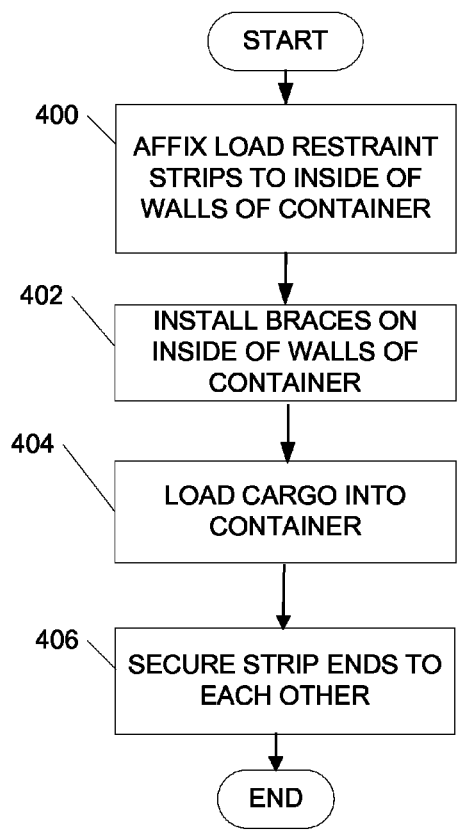
FIGS. 6-8 are a flow charts illustrating example methods of securing cargo in a container according to one or more aspects described herein.
Figure 7:
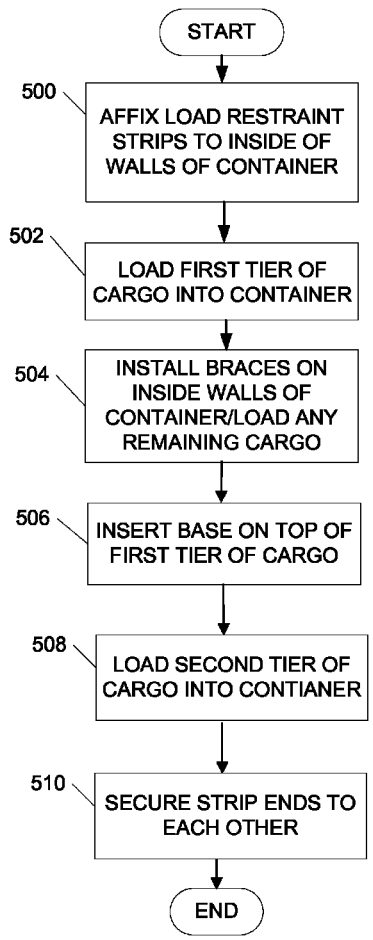
Figure 8:
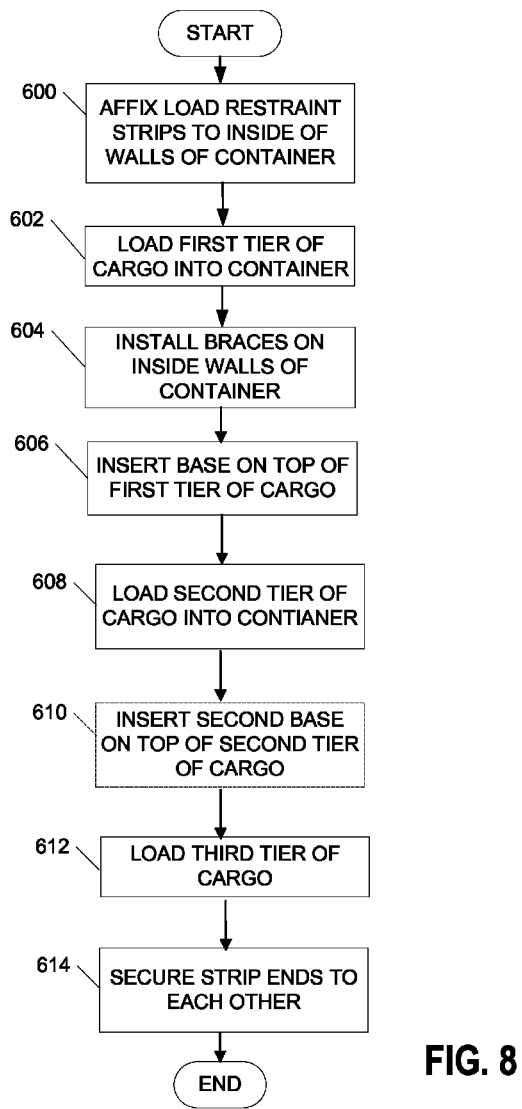

FIGS. 6-8 are flow charts illustrating various example methods of restraining a load within a cargo container according to one or more aspects described herein. The steps provided in each method are merely examples of methods of restraining cargo and various other methods may be implemented using the load restraint strip and brace arrangements discussed above without departing from the invention. Further, some of the steps provided in FIGS. 6-8 may be performed in an order other than the order illustrated in the figures.

FIG. 6 illustrates an example method of restraining a load within a cargo container according to one or more aspects described herein. In the example of FIG. 6, there is only a single tier of cargo. In step 400, an affixing region of each load restraint strip of a pair of load restraint strips is secured to an inside of a wall of the cargo container. An affixing region of one load restraining strip may be affixed to an inside of a first wall and an affixing region of the other load restraining strip of the pair of load restraining strips may be affixed to an inside of a second wall opposite the first wall. In some examples, step 400 may be repeated for additional pairs of load restraint strips being installed. The load restraint strip may be of the type described, for example, in FIGS. 3A and 3B. After adhering the affixing regions of the load restraint strips to the container walls, the free ends of those strips are temporarily moved out of the way (e.g., by taping to the walls or tucking into a space between a container door and a container wall).

In step 402, braces may be installed along each of the opposite walls (e.g., the first wall and the second wall) to which the strips are secured. For instance, one or more braces may each be received within a groove along each wall of the cargo container to which a load restraint strip is affixed. In some examples, one brace may be installed on each wall. In other examples, two or more braces may be installed on each wall. In some arrangements, the braces may be held in place temporarily, such as by using tape or a removable fastener. As discussed for the various arrangements above, the braces may extend along the walls of the container and may contact or be closely spaced from an interior face of the affixing region of the load restraint strip secured to the respective wall. Once the braces are in place (and arranged between the walls and the cargo) the braces will exert an outward reactive pressure, when the load restraint strip is subjected to increased tension, on corresponding portions of the load restraint strips between the braces and the container walls, as discussed above.

In step 404, cargo may be loaded into the container. The cargo may include barrels, drums, boxes, packages, bulk fluid containers, etc., and/or combinations thereof. In some arrangements, the cargo may be positioned along the braces to aid in maintaining the position of the braces. In some arrangements, the cargo may be arranged in two or more physically separate portions such that additional pairs of load restraint strips and braces may be used to secure the physically separate cargo load(s).

In some examples, step 404 of loading the cargo may be performed prior to installing the braces in step 402. Additionally or alternatively, a portion of the cargo may be loaded into the container before the braces are installed and the remainder of the cargo may be loaded after the braces are installed.

Figure 1:
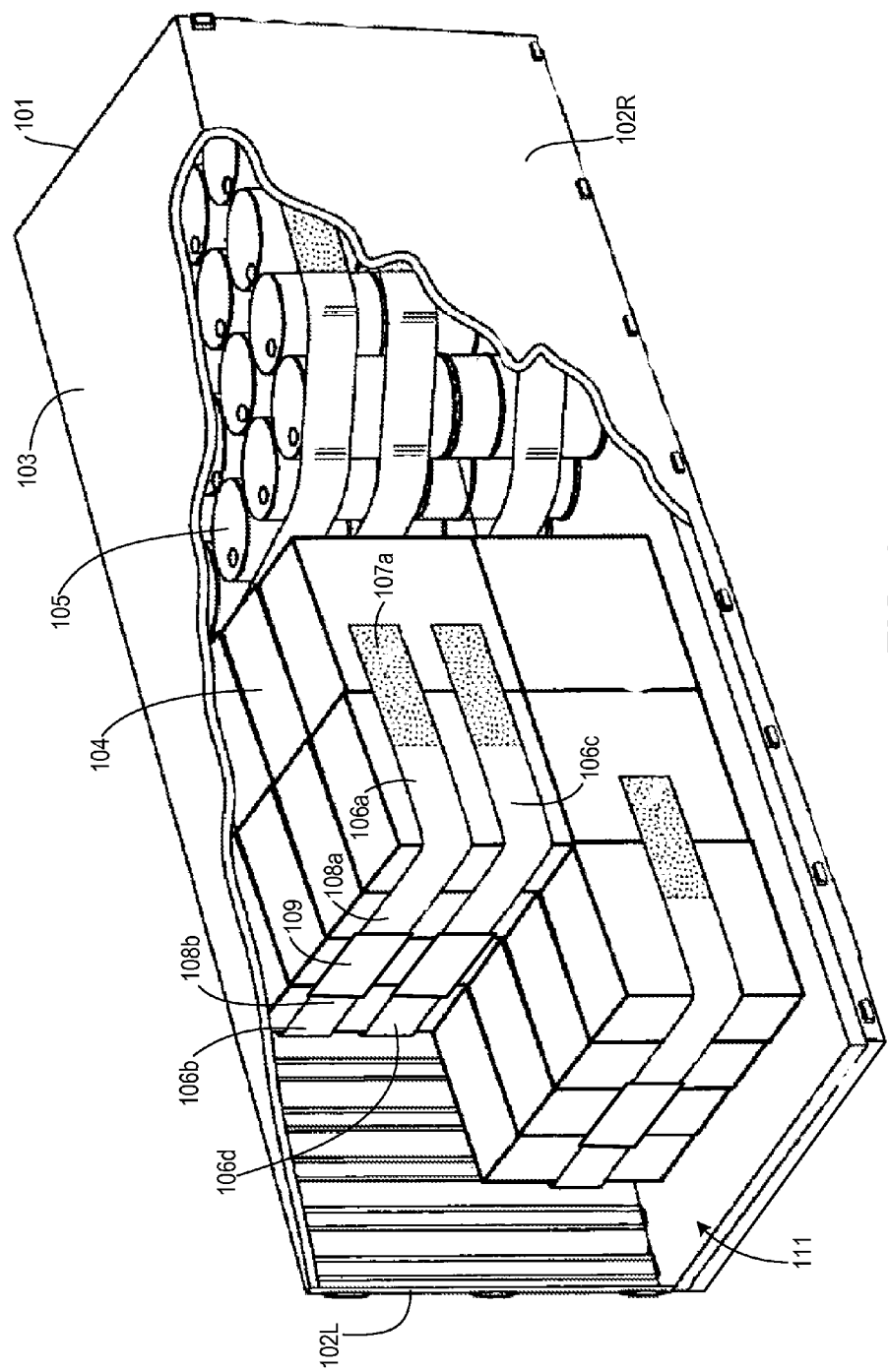
FIG. 1 illustrates a technique for restraining cargo within a shipping container.

In step 408, the ends of the strips of each pair of load restraint strips may be secured to each other in a manner similar to that described in connection with FIG. 1. For instance, free ends of the load restraint strips may be overlapped across a face of the cargo and then tightened. A connecting strip may be used to secure ends of the load restraint strips to each other. The connecting strip may include an adhesive portion configured to contact ends of each of the strips being joined to secure the ends to each other and/or to a portion of the cargo being restrained.

In the example of FIG. 6, only one tier of cargo is described as being restrained by the load restraint system. FIG. 7 illustrates an example method of retraining cargo within a cargo container having two tiers of cargo according to one or more aspects described herein.

In step 500, a pair of load restraint strips for each tier of cargo is secured to walls of the cargo container. Similar to the arrangements discussed above, each strip of a pair of strips is secured to an inside of a wall of the cargo container. In some examples, one or more additional pairs of load restraint strips for one or more tiers of cargo may be secured to the walls in step 500. After adhering the affixing regions of the load restraint strips to the container walls, the free ends of those strips are temporarily moved out of the way (e.g., by taping to the walls or tucking into spaces between container doors and container walls).

In step 502, a first tier of cargo is loaded into the container. In some examples, loading the first tier of cargo may include loading a portion of the first tier of cargo with the remainder to be loaded after other steps are performed.

In step 504, braces are installed along each wall of the cargo container to which a load restraint strip is affixed. In some examples, one brace may be installed along each wall. In other examples, two or more braces may be installed along each wall of the container. The braces may extend substantially an entire height of the cargo container to extend along both tiers of cargo, or may be braces that extend along only one tier of cargo. The braces may be held in place temporarily by tape or other temporary fastener. In arrangements in which only a portion of the cargo was loaded in step 502, the remaining cargo may be loaded after the braces are installed.

In step 506, a base may be installed on top of the first tier of cargo. The base may generally form a foundation for a second tier of cargo to be loaded. However, in some examples, step 506 may be omitted. For instance, if the second tier of cargo is being loaded on pallets, the step (e.g., 506) of installing a base may be omitted. The base may also aid in maintaining a position of the braces installed along the walls of the cargo container. For instance, the braces installed in step 504 may be arranged between the base and the wall and held in place by a friction fit between the wall and the base. In some examples, the braces may be connected to the base, such as by fasteners such as screws, nails, and the like.

In step 508, the second tier of cargo is loaded into the container. In step 510, the strips of each pair of load restraint strips are secured to each other in a manner similar to that described in connection with step 406 of FIG. 6.

FIG. 8 illustrates yet another method of restraining cargo according to one or more aspects described herein. In the example of FIG. 8, three tiers of cargo are loaded into the cargo container. However, additional tiers of cargo may restrained using similar steps.

In step 600, load restraint strips are affixed to the walls of the container. Similar to arrangements discussed above, at least one pair of load restraint strips may be installed for each tier of cargo. In step 602, a first tier of cargo is loaded into the cargo container and in step 604 braces may be installed along each side of the cargo container to which a load restraint strip is affixed. One or more braces may be installed on each side and the braces may extend along the entire height of the cargo to be loaded so as to extend along all tiers of cargo, or may be shorter braces that extend along one or two tiers of cargo. A combination of braces having different lengths may also be used. The braces may be temporarily secured to the walls using tape or other temporary fasteners. Loading the first tier of cargo may also include positioning the cargo in contact with the braces to aid in securing the position of the braces along the walls of the cargo container.

In step 606, a base may be installed on top of the first tier of cargo. In some examples, the braces may extend between the wall and the base such that the base aids in maintaining the position of the braces. As discussed with respect to FIG. 7, the step of installing the base may be omitted if the additional tier(s) of cargo are being loaded on a pallet or other base structure.

In step 608, a second tier of cargo is loaded into the cargo container. The cargo may be loaded or arranged to contact the braces in order to maintain the position of the braces. In optional step 610, another base is installed on top of the second tier of cargo and in step 612 a third tier of cargo is loaded into the cargo container. The third tier of cargo may be positioned against the braces to aid in maintaining the position of the braces.

In step 614, the strips of each pair of load restraint strips are secured to each other in a manner similar to that described in connection with step 406 in FIG. 6.

As discussed above, a load restraint system of braces and load restraint strips such as described herein may be advantageous in securing a load in a cargo container. As discussed, by reinforcing the bond between the affixing region of the load restraint strip and the wall of the container with one or more braces, fewer load restraint strips may be needed to secure the load and/or stronger load restraint strips may be used to secure a load.

Although various brace, load restraint strip, etc. arrangements have been shown and described above, various other example arrangements may be used without departing from the invention. For instance, various combinations of braces with different lengths, numbers of load restraint strips, and the like may be used in combination. Further, the number and/or configuration of braces used on one side of the container may be different from the number and/or configuration of braces on an opposite side.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. For example, one of ordinary skill in the art will appreciate that some steps illustrated in the illustrative figures may be performed in other than the recited order, and that one or more steps illustrated may be optional in one or more embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. A method comprising:
   affixing an affixing region of a first load restraint strip to a first wall of a cargo container;
   positioning a first brace between the first load restraint strip and cargo being restrained by the first load restraint strip, wherein the first brace extends along the first wall of the cargo container, the first brace positioned so as to exert pressure, in response to increased force on the first load restraint strip, against a portion of a face of the first load restraint strip corresponding to the first brace;
   affixing an affixing region of a second load restraint strip to a second wall of the cargo container; and
   positioning a second brace between the second load restraint strip and the cargo being restrained by the second load restraint strip, wherein the second brace extends along the second wall of the cargo container, the second brace positioned so as to exert pressure, in response to increased force on the second load restraint strip, against a portion of a face of the second load restraint strip corresponding to the second brace.

2. A method comprising:
   affixing an affixing region of a first load restraint strip to a first wall of a cargo container; and
   positioning a first brace between the first load restraint strip and cargo being restrained by the first load restraint strip, wherein the first brace extends along the first wall of the cargo container, the first brace positioned so as to exert pressure, in response to increased force on the first load restraint strip, against a portion of a face of the first load restraint strip corresponding to the first brace, and wherein the first wall has a corrugated configuration, the affixing region of the first load restraint strip follows the corrugated configuration of the wall when affixed to the first wall, and the first brace is positioned in a groove of the corrugated wall.

3. The method of claim 1, further including:
   securing the first load restraint strip and the second load restraint strip; and
   joining the first load restraint strip and the second load restraint strip with a connecting strip.

4. The method of claim 1, further including:
   affixing an affixing region of a third load restraint strip to the first wall of the cargo container; and
   positioning a third brace along the first wall of the cargo container such that portions of the first load restraint strip and the third load restraint strip correspond to the third brace on a first side of the third brace and the cargo being restrained by the first and third load restraint strips is arranged on an opposite second side of the third brace, wherein the third brace extends along the first wall of the cargo container and is positioned so as to exert pressure, in response to increased force on the first and third load restraint strips, against the corresponding portions of the first and third load restraint strips located between the third brace and the first wall.

5. The method of claim 1, further including:
   positioning a third brace between the first load restraint strip and the cargo being restrained by the first load restraint strip, wherein the third brace extends along the first wall of the cargo container and is located between an interior face of the first load restraint strip and the cargo, the third brace positioned so as to exert pressure, in response to increased force on the first load restraint strip, against a portion of the interior face of the first load restraint strip corresponding to the third brace.

6. The method of claim 1, wherein the first brace extends along a first tier of cargo.

7. A method comprising:
   affixing an affixing region of a first load restraint strip to a first wall of a cargo container; and
   positioning a first brace between the first load restraint strip and cargo being restrained by the first load restraint strip, wherein the first brace extends along the first wall of the cargo container, the first brace positioned so as to exert pressure, in response to increased force on the first load restraint strip, against a portion of a face of the first load restraint strip corresponding to the first brace, wherein the first brace extends along a first tier of cargo and along a second tier of cargo arranged on top of the first tier of cargo.

8. The method of claim 1, wherein the first brace is formed of at least one of: wood, foam, compressed paper, rigid cardboard, fiberboard corner protectors, plywood strips, and honeycomb paper dunnage.

9. A method comprising:
affixing an affixing region of a first load restraint strip to a first wall of a cargo container; and
positioning a first brace between the first load restraint strip and cargo being restrained by the first load restraint strip, wherein the first brace extends along the first wall of the cargo container, the first brace positioned so as to exert pressure, in response to increased force on the first load restraint strip, against a portion of a face of the first load restraint strip corresponding to the first brace, wherein the first brace is positioned between the first load restraint strip and a first cargo portion;
affixing an affixing region of a second load restraint strip to the first wall of the cargo container; and
positioning a second brace between the second load restraint strip and a second cargo portion being restrained by the second load restraint strip, wherein the second cargo portion is physically separate from the first cargo portion and wherein the second brace extends along the first wall of the cargo container, the second brace positioned so as to exert a pressure, in response to increased force on the second load restraint strip, against a portion of the second load restraint strip corresponding to the second brace.

10. The method of claim 1, wherein positioning the first brace comprises holding the first brace in place using a positioning body to maintain a position of the first brace relative to the portion of the face of the first load restraint strip, and wherein the positioning body is a portion of the cargo.

11. The method of claim 1, wherein positioning the first brace comprises holding the first brace in place using a positioning body to maintain a position of the first brace relative to the portion of the face of the first load restraint strip, and wherein the positioning body is a base supporting the cargo.

12. A method comprising:
affixing an affixing region of a first load restraint strip to a first wall of a cargo container, wherein the first load restraint strip comprises
a base layer,
a reinforcement layer fixed relative to the base layer and having reinforcement material, the reinforcement material consisting essentially of a single cross-weave reinforcement material layer, wherein the reinforcement material layer is the only reinforcement layer of the first load restraint strip, and
an adhesive layer; and
positioning a first brace between the first load restraint strip and cargo being restrained by the first load restraint strip, wherein the first brace extends along the first wall of the cargo container, the first brace positioned so as to exert pressure, in response to increased force on the first load restraint strip, against a portion of a face of the first load restraint strip corresponding to the first brace.

13. The method of claim 12, wherein the single cross-weave reinforcement material layer includes a first set of parallel strands extending in a first direction and a second set of parallel strands interwoven with the first set of strands and extending in a second direction different from the first direction.

* * * * *